United States Patent [19]

Werner et al.

[11] 4,224,928
[45] Sep. 30, 1980

[54] COVER FOR SOLAR HEAT COLLECTOR

[75] Inventors: Frank D. Werner; Lowell A. Kleven; James T. Case; Roger D. Bloomfield, all of Jackson, Wyo.

[73] Assignee: Park Energy Company, Jackson, Wyo.

[21] Appl. No.: 843,685

[22] Filed: Oct. 19, 1977

[51] Int. Cl.² .................................................. F24J 3/02
[52] U.S. Cl. ................................... 126/450; 126/441; 52/788
[58] Field of Search ............... 126/270, 271, 450, 441; 52/788, 762, 588, 762, 481; 165/49, 170, 173; 237/1 A; 285/DIG. 22

[56] References Cited

U.S. PATENT DOCUMENTS

| 1,801,710 | 4/1931 | Abbot | 126/271 |
| 3,072,920 | 1/1963 | Yellott | 126/271 X |
| 3,174,915 | 3/1965 | Edlin | 126/271 |
| 3,731,447 | 5/1973 | Dowdy | 52/481 |
| 3,886,705 | 6/1975 | Cornland | 52/588 X |
| 3,886,998 | 6/1975 | Rowekamp | 126/271 X |
| 3,937,208 | 2/1976 | Katz et al. | 237/1 A X |
| 3,965,887 | 6/1976 | Gromer | 126/271 |
| 4,060,070 | 11/1977 | Harter | 165/173 |
| 4,076,013 | 3/1976 | Bette | 126/270 |
| 4,114,597 | 9/1978 | Erb | 126/270 |

FOREIGN PATENT DOCUMENTS

| 2629544 | 1/1977 | Fed. Rep. of Germany | 126/271 |
| 908930 | 10/1962 | United Kingdom | 285/DIG. 22 |

Primary Examiner—Dave W. Arola
Attorney, Agent, or Firm—Kinney, Lange, Braddock, Westman and Fairbairn

[57] ABSTRACT

An extruded radiant energy transparent cover used with solar heat collector assemblies, and made into modules that are retained in position with support members which securely hold the cover in place. The extruded cover panels are of preferably elongated side by side tubes molded with common walls. A support rib is aligned with each of the walls. Where two of the modules join, two support ribs are placed contiguous, and are held in the same support members as the single ribs. Thus the installation is simplified by the lack of necessity to provide special brackets for holding the modular sections together.

10 Claims, 5 Drawing Figures

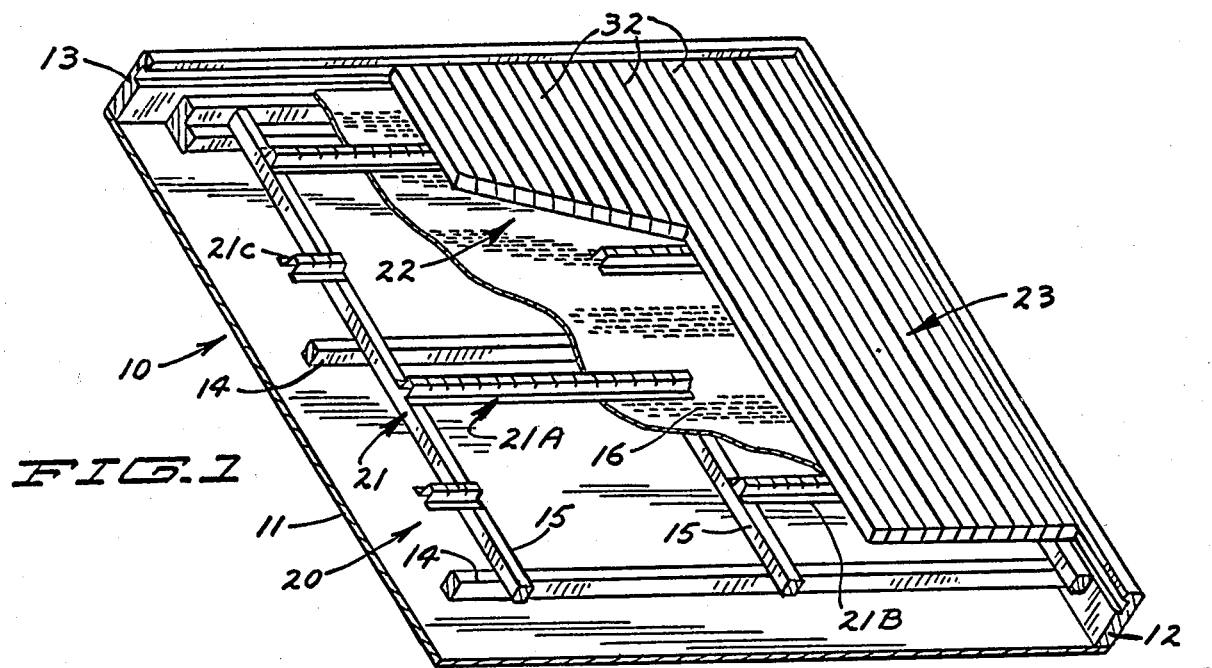
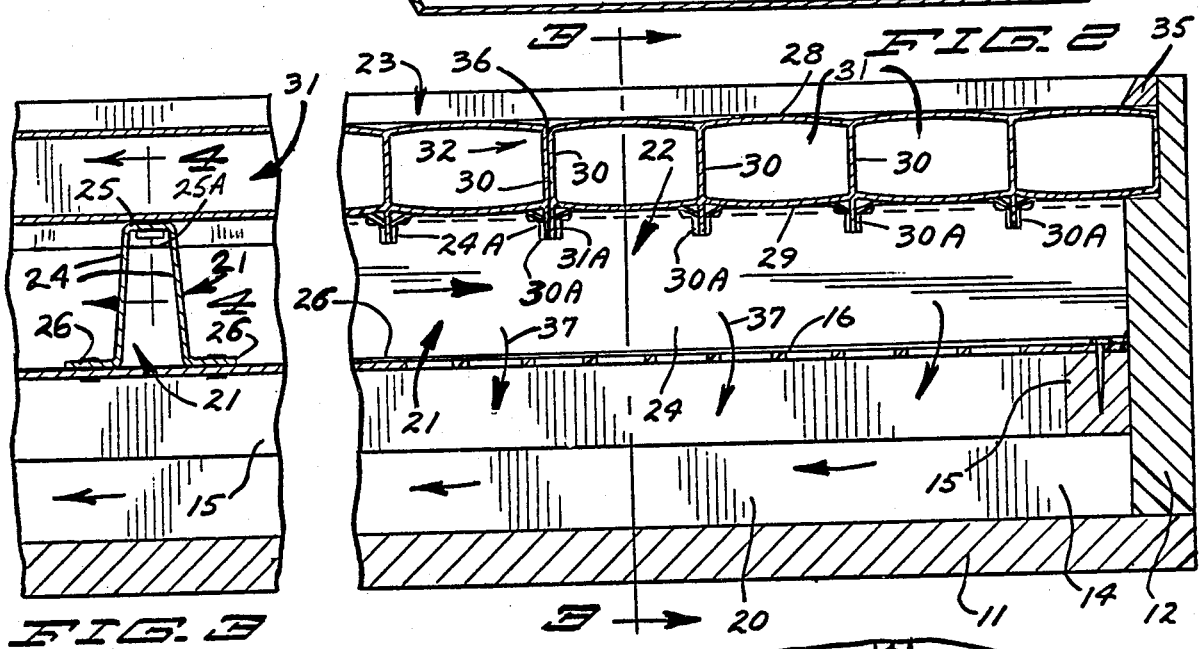
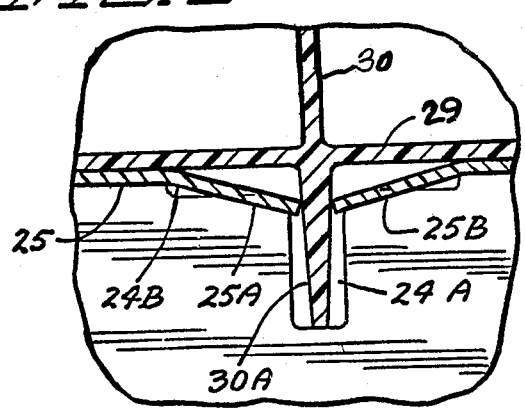
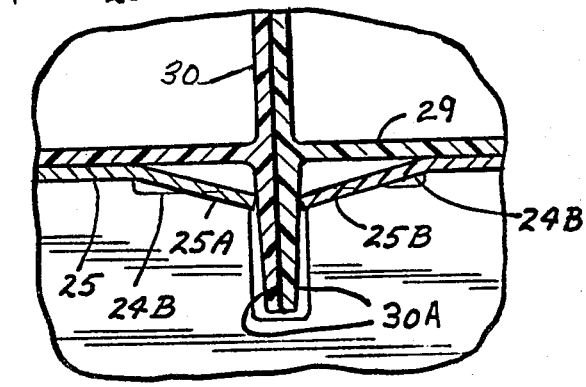

COVER FOR SOLAR HEAT COLLECTOR

BACKGROUND OF THE INVENTION

1. Field of the Invention

The present invention relates to cover sheets for solar heat collectors, and other devices which have covers which must transmit radiant energy.

2. Prior Art

In the prior art various solar heat collectors have been advanced which utilize covers for transmitting solar energy to some type of an energy absorbing sheet that will be heated by the solar energy.

For example, U.S. Pat. No. 1,801,701 shows an apparatus for utilizing solar energy which includes a plurality of elliptical cross section glass tubes that are held together with suitable fastener inserts to form a generally planar assembly. The assembly is placed over an energy absorbing material. The cover in this case transmits solar energy through the glass tubes, onto the energy absorbing material. The purpose of the assembly was for heating liquid such as for domestic power or warming purposes.

Tubes made of glass had to have support material between the individual tubes, and it appears quite difficult to support such tubes adequately.

U.S. Pat. No. 3,886,998 illustrates a solar water heater and chiller combination, which uses a pair of parallel panes of glass for insulation purposes, and which panes transmit solar energy into means for absorbing the solar energy.

Support clips for holding pieces of wallboard together are shown in U.S. Pat. No. 3,731,447, and such clips show receptacles for receiving bead members for retaining devices together.

U.S. Pat. No. 3,937,208 also shows a solar collector system which utilizes transparent glass panes arranged in a spaced apart relationship for insulation purposes for covering the collector itself. Additional devices which use covers that are spaced from the heat collector material include U.S. Pat. No. 3,072,920 which shows dead air spaces being formed above a swimming pool in a cover which transmits solar energy for heating the pool, and U.S. Pat. No. 3,174,915 which illustrates an air supported cover for a solar still.

Further U.S. Pat. No. 3,965,887 illustrates a solar heat collector utilizing a cover that is supported in a spaced relationship to the heat collecting medium.

None of these devices show an extruded plastic cover which can be made into individual modules and held together through suitable universal type support brackets so that the individual modules can be quickly assembled into a cover for a large solar heat collector.

SUMMARY OF THE INVENTION

A transparent cover sheet for use with solar heat collectors which comprises a cover made of extruded plastic having support ribs on the bottom. The sheet is made up of a plurality of modular sections each of which, as shown, comprises a plurality of extruded tubes positioned side by side forming generally parallel elongated openings. The depending support ribs are aligned with each of the dividing walls between adjacent tubes, and ribs are also aligned with the outer walls of the two outside tubes of each modular section. The ribs extend for the full length of the tubes.

In making up a cover sheet a plurality of such modules are placed in side by side relationship, and the depending ribs along the side edges of the modules are placed contiguous with the ribs of the next module. The modules are then fastened together with suitable adhesive or epoxy, and the cover sheet assembly is supported with special brackets which have receptacles to receive each of the ribs. The receptacles are of such size that they will receive and hold the two contiguous ribs between adjacent modules of the cover and will also retain the individual ribs which align with each of the individual walls between the tubes forming the cover. The receptacles have spring loaded tabs which tend to retain the ribs once the ribs have been inserted.

The cover is transparent to radiant energy and preferably is made of a suitable polycarbonate material such as that sold under the Trademark "Lexan" by General Electric Company. The tubes provide dead air spaces which act as insulation to minimize heat loss from the underlying solar energy collector sheets. Yet, the extruded tubular members are easily made and light in weight. While the primary use envisioned of the cover sheets is for solar energy collectors, the same type of sheet assembly can be used for other types of panels such as windows, skylights, and room dividers.

Another advantage of the present device is that it does not have any frame members on the exterior of individual modular sections. If the extruded modules are made in lengths of 12 or 16 feet, for example, the width of the cover assembly can be made as wide as desired by adding on more modules in side by side relationship. The cover assembly will be adequately supported across its width by adding brackets underneath without any intermediate frame members. This means that for a given size of solar heat collector a greater area of the occupied space is effectively utilized for collection of heat, as compared to other collectors which require intermediate frames at intervals. Further the overall appearance is uniform without any pattern of fixed frames.

Thus the cover provides for a low cost, attractive, highly useful cover for solar heat collectors.

BRIEF DESCRIPTION OF THE DRAWINGS

FIG. 1 is a fragmentary perspective view of a typical solar heat collector utilizing a cover made according to the present invention with parts broken away to illustrate the construction of the unit;

FIG. 2 is a fragmentary vertical sectional view of a portion of the device of FIG. 1;

FIG. 3 is a sectional view taken as on line 3—3 in FIG. 2;

FIG. 4 is a sectional view taken as on line 4—4 in FIG. 3; and

FIG. 5 is a sectional view taken substantially on the same line of sight as FIG. 4, but illustrating a connection between two of the cover modules utilized in the present invention.

DESCRIPTION OF THE PREFERRED EMBODIMENT

Referring to FIG. 1, a solar heat collector illustrated generally at 10 includes a base board such as a sheet of plywood, metal or any desired material indicated at 11, and upright perimeter frame members 12 and 13. These frame members of course would extend all the way around the unit, but are shown only for illustrative purposes. The bottom or base panel can be made of several individual sheets of material to achieve the desired size. A plurality of first stringers made up of dimension lumber as shown or metal or plastic if desired, illustrated generally at 14 are extended laterally across the base panel 11, and fastened in place in a suitable manner. These first stringers may be of 2"×2" lumber and they are spaced apart a desired amount. Second cross stringers 15, also of 2"×2" dimension lumber, extend transversely to the members 14 and are spaced from each other as shown.

A sheet of perforated, radiant energy absorbing, heat transferring material indicated generally at 16 is placed over the upper stringers 15, and is stapled into place on these stringers in a desired manner. This sheet is similar to that shown in United States Patent Application of Frank D. Werner et al., Ser. No. 694,338, filed June 9, 1976 for "Perforated Heat Transfer Sheet". The sheet has small apertures therein and fluid (air) is forced through the slits or apertures in sheet 16 in a heat transfer relationship.

The open grid of stringers 14 and 15 form an air passageway indicated generally at 20 (FIG. 2) below the perforated sheet 16. A similar heat collector device is shown and explained in said application Ser. No. 694,338, and this is represented schematically for purposes of illustration.

To support the cover assembly for the collector in place, a plurality of brackets indicated generally at 21 are placed between the stringers 15 at desired locations. The brackets are not butted end to end, but are staggered or offset between adjacent stringers or members 15. Such a bracket is shown at 21A, between two of the stringers 15, and also individual brackets are shown at 21B and 21C in FIG. 1. The staggering of the brackets permits the air to circulate freely above the perforated sheet 16 in a space generally indicated at 22 which is below the cover assembly indicated at 23 in general form. The brackets 21 are formed as shown in FIG. 3 in a generally "hat shaped" cross section. The section is a downwardly open U shape, having side walls 24,24, and lower outwardly extending flanges 26 which are nailed to the stringers or members 15 through the perforated sheet 16. The brackets 21 also include a top wall 25 joining walls 24,24.

At the desired spacings, (which will be determined by the size of the individual tube construction of the cover assembly 23) the side walls 24,24 are notched transversely as shown in FIG. 4 with notches 24A. The upper wall 25 is slit transversely and the walls 24 and 25 are also notched as at 24B to form the tab portions 25A and 25B, respectively that may be bent downwardly to extend between walls 24. The notches 24A and 24B are formed into both of the walls 24, and small portions of wall 25, and are aligned transversely.

The cover assembly 23 includes a plurality of extruded tubes. The tubes are defined by a top wall panel 28, and a bottom wall panel 29 and which walls are separated by partition walls 30 separating the tubes. The top wall 28 is continuous across each of the modular sections. As shown, the modular sections each include four of the tubes. The tubes form passageways 31. Aligned with and below each of the partition walls 30 there is a rib 30A protruding from the lower wall 29. As shown at 32, where two of the modular portions meet, the outer edge walls of two adjacent modular sections are contiguous, and the outer edge ribs 30A,30A are also contiguous as shown.

The modules are extruded so that the tube passageways 31 extend unbroken along the length of the cover assembly as shown in FIG. 1. The tubes can extend for several feet in length, for example from 12 to 16 feet. The ribs 30A and walls 30 provide rigidity to the sections.

The ribs 30A are spaced apart the same distances as the notches or receptacles in the brackets 21, and after the brackets have been nailed into place, the cover assembly can merely be pushed down into position onto the brackets and the tabs 25A and 25B will bend and depress as shown in FIGS. 4 and 5 and the opposite edges of the tabs 25A and 25B will engage the aligning rib 30A that is placed into the corresponding receptacle 21A. The tabs, which are spring loaded, will tightly grip the respective rib to hold the cover assembly 23 in position.

Where two ribs 30A,30A are contiguous as shown in FIG. 5, they will still fit into a receptacle 24, and the tabs 25A and 25B will merely be bent down farther to hold the two adjacent modular sections tightly together.

At wall 12 the rib that should normally depend from the outer side wall 30 of the outer tube 31 is removed. The edge of the cover is fitted into a recess at the upper part of the wall 12 as shown, and a sealing and retaining strip 35 is nailed into position over the cover assembly above the cover wall 28 to hold the cover snugly in its receptacle on the wall 12. The same type of connection is used for holding the ends of the tubes relative to the wall 13. The ends and edges can be sealed with suitable caulking compound or silicone rubber seals so that the cover unit is air tight.

In between the individual sections, as indicated at lines 36, a solvent type cement material can be placed along the longitudinal seam to seal and join the contiguous walls 30,30 of the two different modular sections of the extruded cover.

Thus, the cover assembly is made in modular sections. The assembled sections are easily slipped into the support brackets once the support brackets have been nailed into place. The number of support brackets can be modified as desired to adequately support the cover for any type of use. The brackets provide for a large space for air circulation between the cover and the top of the perforated energy absorbing sheet 16 so that air can flow as shown by the arrows 37 from the top chamber 22 through the apertures in the sheet 16 into the lower chamber 20 and then to a suitable location where the heat will be stored or utilized.

If desired, the panels can be used for skylights or the like, and the brackets which provide merely push-in mounting and secure retaining at desired spacing along the ribs 30A can be utilized for adequate support to carry high loads if necessary.

Thus the cover is not supported only at perimeter frames, but can be supported in intermediate positions by use of the brackets which do not block off airflow but can be staggered as shown to permit air to flow around the brackets in the chamber 22 uninhibited.

The cover can be removed, but the tabs 25A and 25B will have to be deflected down before the individual cover panels can be easily removed from their brackets.

The cover can be made only single wall if desired. In other words, a single sheet having depending ribs 30A which fit into support brackets as shown may be used if desired. The cover assembly is radiant energy transparent or transmitting so the radiant energy absorbing perforated sheet is adequately heated.

What is claimed is:

1. A cover sheet assembly for use in connection with a solar heat collector comprising an extruded unitary member comprising a pair of generally coextensive radiant energy transmitting panels spaced apart in a direction perpendicular to the general plane of the cover sheet assembly, and having a longitudinal length and a transverse width, means forming a plurality of individual tubular passageways comprising separated generally parallel walls spaced apart in transverse direction and extending between and fixed to said panels along the longitudinal length of said panels, a plurality of spaced apart, individual rib members each having one free edge and having the other edge fixed to one panel, each positioned in alignment with one of said separated walls and extending along the length of the panels and generally normal to the one panel and extending in a direction away from the second panel, said rib members being narrow in direction parallel to the plane of said cover sheet assembly and being substantially uniform in cross section throughout their length to permit supporting of said rib members at their free edges at any desired location along the longitudinal length thereof.

2. The combination as specified in claim 1 and a support member for said cover assembly comprising a bracket having a plurality of receptacles defined in an upper edge thereof to receive the ribs of at least a portion of said cover assembly, a separate pair of gripping tabs mounted on opposite sides of each receptacle and said tabs of each pair being positioned on opposite sides of the respective rib when a rib is in position in said receptacle to engage and grip the respective rib.

3. The combination as specified in claim 2 wherein said tabs have sufficient resilience to receive a double rib where adjacent modular sections join.

4. The combination as specified in claim 1 wherein said cover assembly comprises an extruded plastic assembly having thin upper and lower panels, and made into desired lengths.

5. The combination as specified in claim 4 wherein said plastic comprises a polycarbonate plastic.

6. In a solar heat collector for use in collecting solar energy comprising a base member having a desired surface area for solar heat collection, the improvement comprising a cover member for said solar heat collector including a radiant energy transmitting wall panel, having a longitudinal length and a transverse width, said cover member having a plurality of ribs depending therefrom and extending in direction along the longitudinal length at desired spaced apart intervals in transverse direction, and support bracket means for supporting said cover assembly comprising a plurality of brackets mounted on said base member arranged in a predetermined configuration and each having receptacle means to receive the ribs of said cover member, each of said brackets extending transversely for less than the entire transverse width of the cover member and being spaced from other brackets in longitudinal direction along the longitudinal length of said ribs.

7. A cover sheet assembly for use in connection with a solar heat collector comprising a plurality of modular sections each comprising a pair of generally coextensive radiant energy transmitting panels spaced apart in a direction perpendicular to the general plane of the cover sheet assembly, said panels having a longitudinal length and a transverse width, means forming a plurality of individual tubular passageways comprising separated generally parallel walls spaced apart in transverse direction and extending between and fixed to said panels along the longitudinal length of said panels, a plurality of rib members fixed to one panel and positioned in alignment with one of said separated walls, said rib members being narrow in direction parallel to the plane of said cover sheet assembly and being substantially uniform in cross section throughout their length to permit supporting of said rib members at any desired location along the longitudinal length thereof, each of said sections having ribs along the outer longitudinal edges thereof whereby the ribs on the edges of adjacent sections may be held together to hold the adjacent modular sections together and to support the sections.

8. A cover sheet assembly for use in connection with an opening comprising a pair of generally coextensive panes of radiant energy transmitting material spaced apart in a direction perpendicular to the general plane of the cover sheet assembly, a plurality of walls joining the pair of panes of material to form a plurality of individual tubular passageways, said walls each extending between said panes in direction along the longitudinal length of said cover sheet assembly, a plurality of rib members extending outwardly from one of said panes and generally parallel to said walls, each of said rib members being aligned with one of said walls, said rib members being narrow in direction parallel to the plane of said cover sheet assembly and being of substantially uniform cross section along their length, a plurality of support members mounted with respect to said frame, and extending in direction transverse to the rib members, each support member including a plurality of receptacles spaced apart substantially the same distance as the spacing of said rib members, and resilient means on said support members to resiliently engage and retain the rib members positioned in each receptacle.

9. A cover sheet assembly for use in connection with an opening having a frame comprising a radiant energy transmitting sheet of material, said sheet having a longitudinal length and a transverse width, a plurality of rib members extending generally parallel to the longitudinal length and being spaced apart at desired intervals across the width, said rib members being narrow in direction parallel to the plane of said cover sheet and being of substantially uniform cross section throughout their length, a plurality of support members mounted with respect to said frame and each including a plurality of receptacles spaced apart at substantially the same distance as said ribs, said support members each comprising an inverted "U" shaped central member having a first wall facing said sheet of material and a pair of support walls joining said first wall and extending in direction away from said sheet of material, said receptacles being defined by notches cut into said support walls and portions of said first wall, and means for engaging and retaining ribs positioned in each receptacle comprising a pair of tabs formed from second portions of said first wall and joined to said first wall, and together defining at least a portion of the opening to the respective receptacle, said tabs being separated from the first wall and spaced so they are resiliently bent in direction away from said sheet of material as the ribs are inserted into the respective receptacle.

10. The combination of claim 16 wherein the tabs at each receptacle engage opposite sides of the same rib when a rib is inserted into the respective receptacle.

* * * * *